(No Model.)

T. W. REED.
STALK SPLITTING MACHINE FOR WHIPS.

No. 454,497. Patented June 23, 1891.

Witnesses

Inventor
Thomas W. Reed
By B. Pickering
Attorney

UNITED STATES PATENT OFFICE.

THOMAS W. REED, OF TIPPECANOE CITY, OHIO.

STALK-SPLITTING MACHINE FOR WHIPS.

SPECIFICATION forming part of Letters Patent No. 454,497, dated June 23, 1891.

Application filed October 24, 1890. Serial No. 369,261. (No model.)

*To all whom it may concern:*

Be it known that I, THOMAS W. REED, a citizen of the United States, residing at Tippecanoe City, in the county of Miami and State of Ohio, have invented certain new and useful Improvements in Stalk-Splitting Machines for Whips; and I do hereby declare that the following is a full, clear, and exact description of the invention, which will enable others skilled in the art to which it appertains to make and use the same, reference being had to the accompanying drawings, and to the letters and figures of reference marked thereon, which form a part of this specification.

My invention relates to improvements in a machine patented to M. E. Moore April 17, 1877, No. 189,569, for fitting sidings for whips; and my improvements consist in an attachment to said machine, which I entitle "stalk-splitting machine for whips."

The object of my invention is the splitting of a stalk of rattan in halves, but so divided that the knife separates by entering the end a little to one side of the center and ending a like distance on the opposite side by a series of rollers, part of which are circumferentially serrated and arranged in the front and rear of said knife, and between which said stalk is carried and guided as to longitudinal direction by a cam and guide-bar. I attain the object by the mechanism illustrated in the accompanying drawings, in which—

Figure 1:
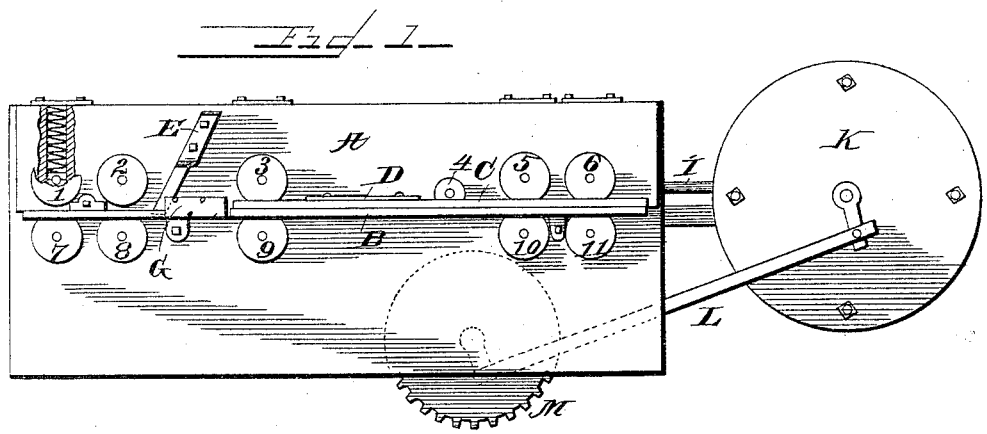
Figure 2:
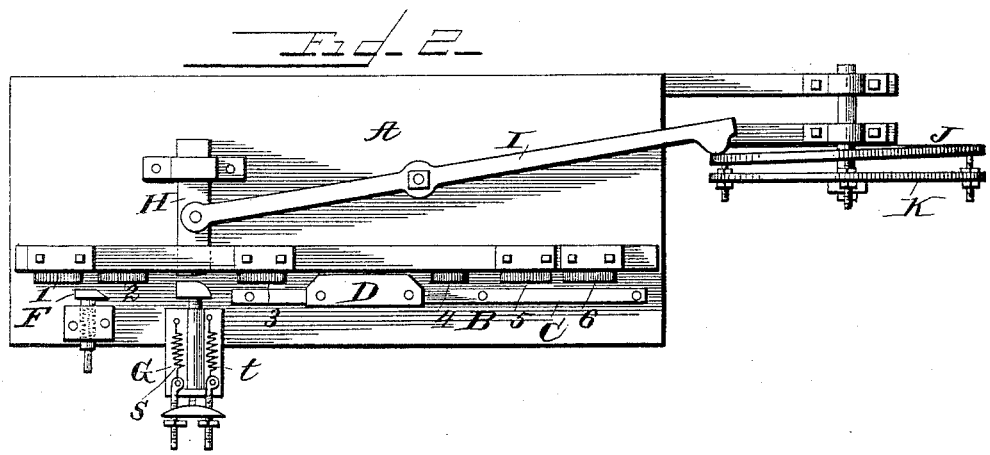
Figure 3:
Figure 4:
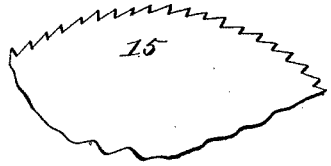

Figure 1 is a side elevation of the machine with the leg-supports omitted. Fig. 2 is a top view of the same. Fig. 3 is a broken part of one of the guide-wheels. Fig. 4 is a broken part of one of the feed-wheels.

The drawings in illustrating the Moore machine are sufficient to comprehend the relation of my attachment to the same and the function jointly effected by the combination—that of dividing the rattan in halves—the line of division being at a very slight angle from the longitudinal center. The driving mechanism and gear are not shown; but the gear is such that the series of rollers above and below rotate in the same time.

A is the side wall of the frame, to which is bolted the metallic table B, the upper surface of which is on a line of the peripheries of the rollers. On this table near the sides of the rollers is fastened the guide-bar C, and to the top of this is bolted the plate D near the center of the machine. These parts serve to hold the rattan stalk in proper position. The rollers 1, 2, 3, 5, and 6 have serrated peripheries, and also the rollers below 10 and 11, all of which are feed-rollers, which serve to carry the stalk from right to left. The serrations of all of these rollers are shown by a broken portion 15, Fig. 4. In the Moore machine the rollers 7, 8, and 9 are the same as the foregoing; but these are replaced by circumferentially-serrated rollers attached to their respective shafts and in form are illustrated at 14, Fig. 3. The effect is to prevent the turning of the stalk by the circumferential sharp edges engaging the surface of said stalk, and therefore when the same is separated in halves the surface would be a plane surface, and not turned, as would be the case if a stalk of twisting fiber was divided by the hand in the customary manner. The knife E is bolted to the side of the frame, and the point sets out a little distance from said side and the end terminates in a slot of the table. The knife is not shown in Fig. 2; but the movable guides H and G, which are arranged in close proximity to said knife, are the better shown.

At the right end of the machine in suitable bearings is the wheel K, to the rear surface of which is bolted the plate J to serve as a cam, the function of which, with the guide H, is to so hold the stalk that the knife will separate the same at an angle to its longitudinal center. This cam turns once to eight revolutions of the feed-rollers. One end of the arm I bears against the face of the cam and the other end is coupled with the guide H, the effect being to separate the stalk, as heretofore described. The guide G, which presses inwardly by an interior spring and the supplemental springs $s$ and $t$, hold the stalk very firmly against the slowly-moving guide H. F is a similar guide pressing against the stalk intermediate between the two pairs of rollers.

At the left end of Fig. 1 the side of the frame is partially cut away to show the spiral spring pressing down upon the upper bearings of the upper series of rollers.

M is a cog-wheel communicating with the driving-shaft, and is connected by the bar L to rotate the cam.

The operation is thus: Enter the rattan stalk between the first feed-rollers when the cam is at its lowest point. As it is carried along within the guides and rollers the same is cut in twain in such manner that by reversing the ends the two parts form a tapering stalk in suitable form to form sidings and chinks used in the construction of a whipstock.

The table, with its appendages, the serrated guide-rollers, and the knife are all that I add to the Moore machine.

Having fully described my invention, what I claim, and desire to secure by Letters Patent, is—

1. In a stalk-splitting machine for whips, the combination of the rollers 1 and 2, having their faces transversely serrated, rollers 7, 8, and 9, with circumferential serrations in grooves to prevent the turning of stalks conveyed therein, the cam-guide with bar and cam to operate the same, the pressure-guide acting against said cam-guide, and the knife E, held rigidly to the frame, substantially as set forth.

2. The combination of the transversely-serrated carrying-rollers, the circumferentially-grooved serrated rollers to prevent rattan stalks turning therein as they are being carried along, and the knife held rigidly to the frame, substantially as set forth.

In testimony that I claim the foregoing as my own I affix my signature in presence of two witnesses.

THOMAS W. REED.

Witnesses:
J. A. KERR,
W. W. WESLER.